Figure 1:
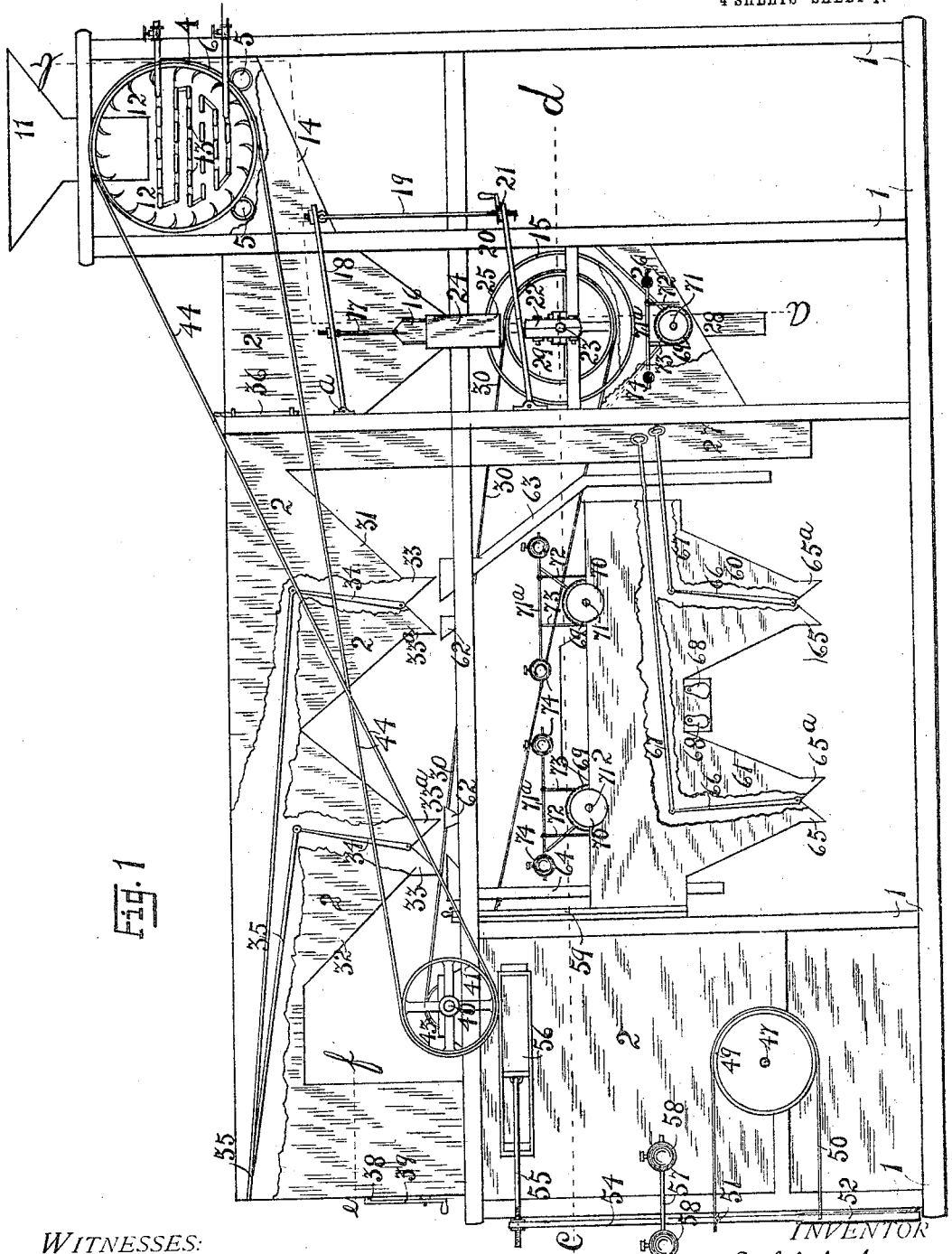

No. 807,659. PATENTED DEC. 19, 1905.
W. P. CLIFFORD.
ORE SEPARATING AND CONCENTRATING MACHINE.
APPLICATION FILED NOV. 21, 1904.

4 SHEETS—SHEET 3.

WITNESSES:
H. E. Mantz
W. W. Gerhart

INVENTOR
William P. Clifford
BY
Obed C. Billman
His Attorney

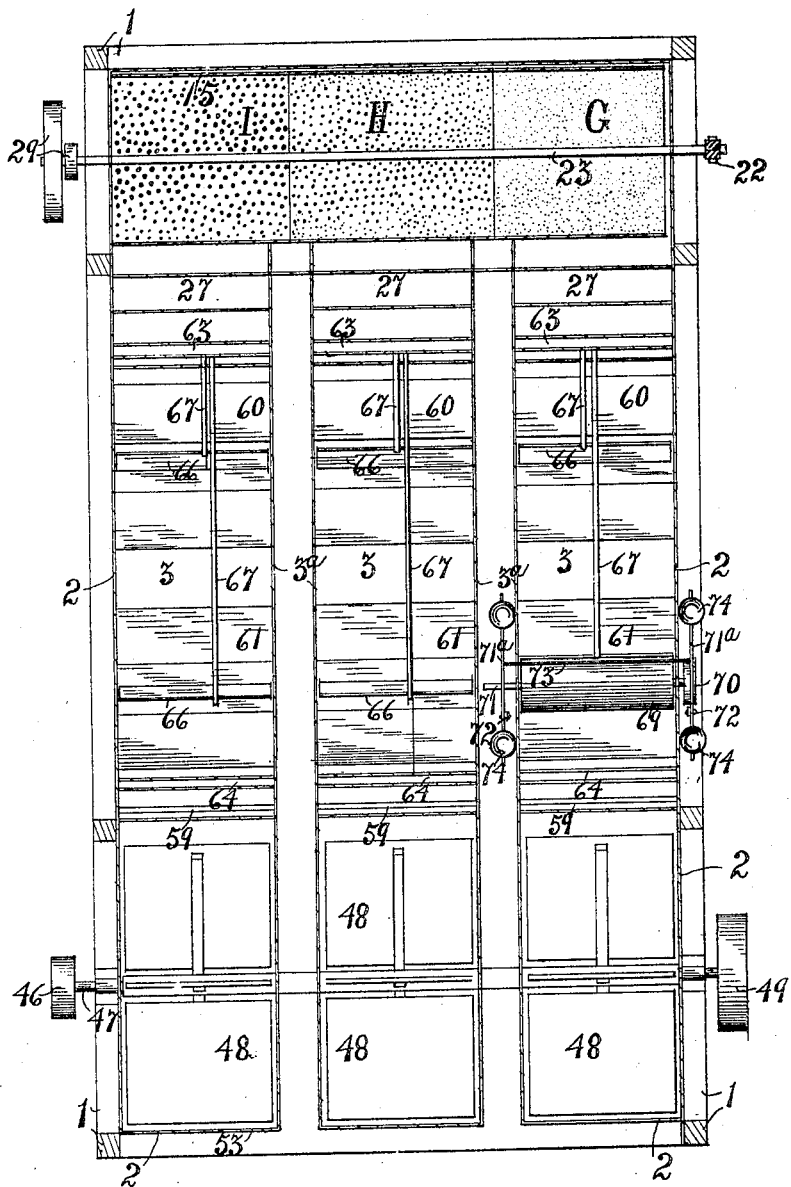

UNITED STATES PATENT OFFICE.

WILLIAM P. CLIFFORD, OF ICONIUM, IOWA, ASSIGNOR OF ONE-HALF TO W. W. RANKIN, OF OTTUMWA, IOWA, AND ONE-SIXTH TO ALBERT B. CLINTON AND ONE-SIXTH TO JOHN C. COOK, BOTH OF RUSSELL, IOWA.

ORE SEPARATING AND CONCENTRATING MACHINE.

No. 807,659.    Specification of Letters Patent.    Patented Dec. 19, 1905.

Application filed November 21, 1904. Serial No. 233,601.

*To all whom it may concern:*

Be it known that I, WILLIAM P. CLIFFORD, a citizen of the United States, residing at Iconium, in the county of Appanoose and State of Iowa, have invented new and useful Improvements in Ore Separating and Concentrating Machines, of which the following is a specification.

My invention relates to improvements in ore separating and concentrating machines; and the invention belongs to that type or class of machines in which the crushed or reduced ore is first dried by means of an inclined revolving iron drum, then classified into various sizes by means of cylindrical screens, known as "trommels," and finally the valuable particles are concentrated into as small a bulk as is economically advantageous by the fall of the particles in air-currents. This concentration of particles is generally brought about by the fall of the particles in water; but, as is well known, by this process the concentration depends upon the difference in specific gravity of the valuable ore and the waste vein stone or rock. Particles which have equal velocities of fall, though differing in size and specific gravity, are said to be equal-falling or equivalent. Consequently before we can separate properly by water, it is necessary to classify the particles by size, so that equivalence shall not prevent a separation or lessen its sharpness.

The principal machine for separating particles of sizes ranging between one inch and one-fiftieth of an inch is the jig or jigger. The smaller sizes are separated by a variety of machines. The action of many of them is based upon the behavior of particles carried down an inclined plane by a thin stream of water. If the gradient of the plane and the strength of the thin current are properly arranged, the denser particles will be deposited and the specifically lighter ones washed away, although they may be equal-falling if allowed to settle in deep water.

The paramount object of this invention is to overcome many of the difficulties experienced in concentrating in water and to produce a generally improved ore separating and concentrating machine which will be simple in construction, cheap of manufacture, and efficient in use.

With these ends in view the invention consists in the novel construction, arrangement, and combination of parts hereinafter described, illustrated in the accompanying drawings, and particularly pointed out in the appended claims.

Figure 2:
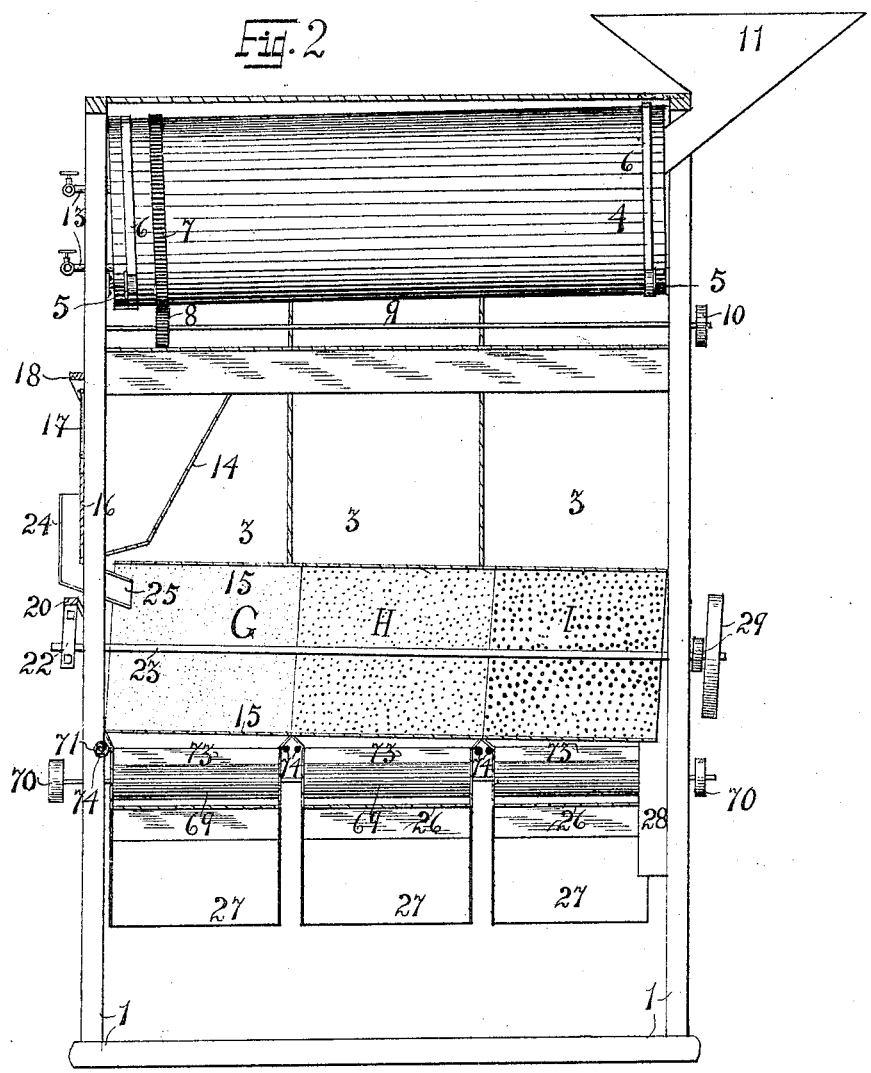
Figure 3:
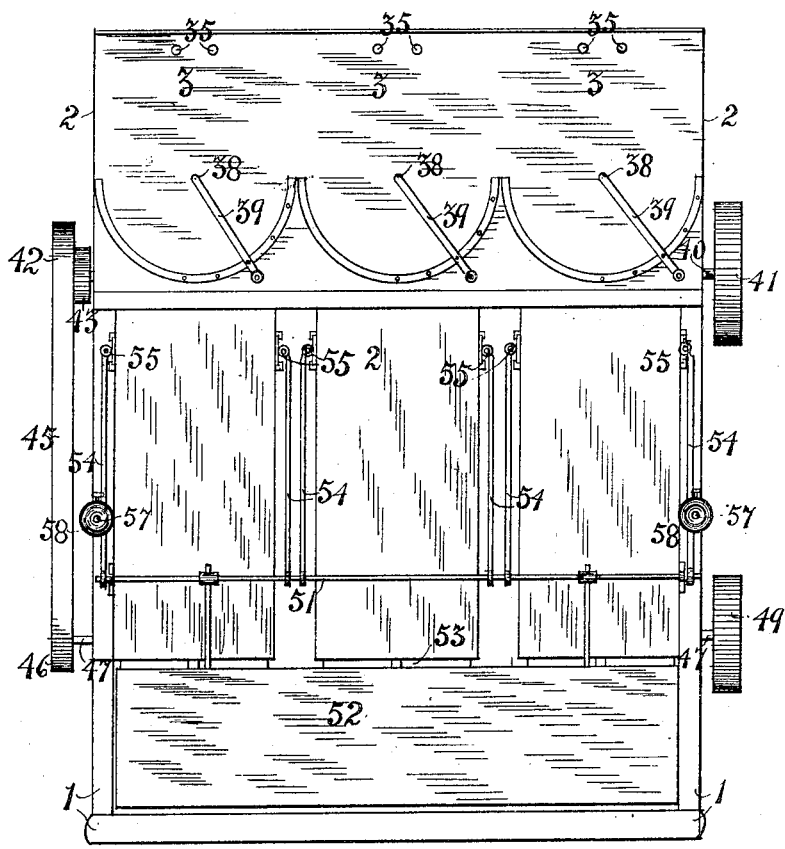
Figure 4:
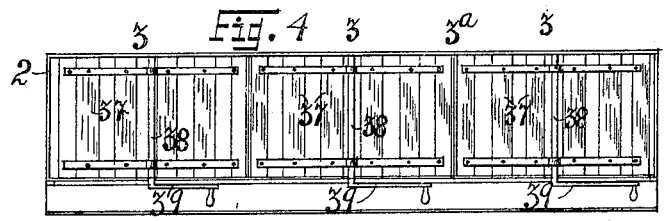

Referring now to the accompanying drawings, forming a part of this specification, Figure 1 is a side elevation of my improved ore separating and concentrating machine, with a portion of its side wall broken away in order that the construction of some of its parts may be more readily understood. Fig. 2 is a transverse sectional view of the front or receiving end of the machine, taken through line $a\,b$ of Fig. 1. Fig. 3 is a view of the rear or fan end of the machine. Fig. 4 is a horizontal sectional view taken through line $e\,f$ of Fig. 1. Fig. 5 is a horizontal sectional view taken through line $c\,d$ of Fig. 1.

Similar numerals and letters of reference indicate like parts throughout all the figures of the drawings.

In the drawings, 1 designates the frame of the machine, consisting of suitable base-beams and uprights to which are secured the side and end walls of the machine 2, and which machine is divided in the present instance into three divisions or sections 3 by means of partition or division walls $3^a$ extending lengthwise of the machine, substantially as shown.

4 designates an inclined revoluble iron drum mounted at one end of the machine, as shown, and supported and adapted to be revolved upon a pair of pinions 5, suitably mounted and secured to the side walls of the machine. 6 designates an annular track or band formed about said inclined revoluble iron drum 4, near each end thereof, and adapted to travel upon the travelers 5 when the drum 4 is revolved. 7 designates a cogged track or band mounted upon said revoluble iron drum 4 and meshing with a cog-wheel 8, mounted upon a shaft 9, (see Fig. 2,) suitably secured to the frame of the machine and provided at its end with a pulley 10.

11 designates a receiving-hopper designed to receive the crushed or disintegrated ore and convey and discharge the same within one end of the revoluble iron drum 4, where it is caught and carried by a series of lifters 12, formed within and about the inner periphery of the revoluble drum 4 and over and about a series of coiled steam-pipes 13, mounted within the drum 4, and as the ore falls over, through, and about said coiled pipes 13 it is thoroughly dried before reaching the other or discharge end of the revoluble drum 4. The ore then falls into a hopper 14, mounted immediately beneath the discharge end of the drum 4 and from there is fed and conveyed within the end of an inclined revoluble sizing reel or screen 15, to be hereinafter more fully described, by means of an adjustable feeding device consisting of a slidably and vertically mounted gate 16, adapted to be moved vertically by means of a bar 17, secured to its upper end and connected to a lever 18, having one end pivotally secured, as at $a$, to one of the uprights of the machine and the other or free end connected to a vertically-disposed bar 19, adjustably secured at its lower end to the free end of a second lever 20 by means of an adjustably-mounted hand nut or plate 21, secured and mounted upon the end of said second lever 20 in any suitable and convenient manner. The lever 20 is pivotally mounted at its inner end like the lever 18 and passes over a cam plate or block 22, secured to the end of the shaft 23, suitably mounted on the frame of the machine and upon which shaft 23 the sizing reel or screen 15 is mounted and secured.

24 designates a spouting secured at one side of the machine and taking over the feed opening and gate 16 and provided at its lower end with an inwardly and downwardly extending chute 25, extending into one end of the sizing reel or screen 15 and adapted to convey the crushed ore therein.

The sizing reel or screen 15 is divided in the present instance into three divisions G, H, and I, as shown, the meshes and perforations of which are of different size, so that the ore will be graded into fine, medium, and coarse ore, respectively, and falling through the same passes down into the divisions or sections 3 and over the chute 26 below and is conveyed by said chute 26 into the three divisions or sections of the vertically-disposed suction-trunks 27, where the current of air passing up through the same carries the finer or lighter particles of rocks and ore up and over the various trunks to be hereinafter described, a part of the finished ore, however, being deposited below the suction-trunks 27.

28 designates a spouting formed at one side of the machine just beneath the lower end of the sizing reel or screen 15 and adapted to receive the coarser unfinished ore and deposit the same below, where it may be taken up and conveyed to the disintegrating-machine in any suitable and convenient manner.

29 designates pulleys mounted on the end of the shaft 23 and over the larger of which passes a belting 30, by means of which the screen 15 is revolved.

31 and 32 designate two trunks formed in the divisions or sections 3 of the machine and provided with the inclined inwardly-extending sides or chutes, terminating at the lower ends in the valves 33 and 33$^a$.

34 designates dividing boards or partitions mounted transversely in the trunks 31 and 32 and pivotally attached at their lower ends intermediate the valves 33 and 33$^a$, formed at the lower ends of said trunks.

35 designates operating-rods attached to the upper or free ends of the dividing boards or partitions 34 and extending longitudinally to the rear or fan end of the machine, by means of which the dividing boards or partitions may be set at any desired point or inclination in trunks 31 and 32 to provide for various ores and the desired concentrations thereof. 36 designates valves formed at the front of the divisions or sections 3 of said trunks 31 and 32 to provide for the increasing or decreasing of the volume of air in said trunks, as the treatment of the various ores may require.

37 designates a series of horizontally-arranged depending swinging valves mounted in the rear of the divisions or sections 3 of the machine upon shafts 38, provided with operating-handles 39, by means of which the volume of air admitted and passing to the suction-fans below may be regulated.

40 designates a shaft mounted in suitable bearings attached to the frame of the machine and provided at one end with a pulley 41 and at the other end with a pulley 42 and a smaller pulley 43.

44 designates a belting passing over the pulley 41 and over and about one end of the inclined revoluble drum 4, by means of which motion is transmitted to the latter.

Passing over and about the smaller pulley 43 is the belting 30, which passes over and drives the large pulley 29, hereinbefore referred to, and by means of which the sizing reel or screen 15 is revolved.

45 designates a belting passing over the pulley 42 and over a pulley 46, mounted upon the end of the fan-shaft 47, mounted in suitable bearings and carrying the large suction-fans 48.

49 designates the main driving-pulley, mounted on the fan-shaft 47 and over which passes the main driving-belt 50, communicating with any suitable source of power.

51 designates a shaft mounted in suitable bearings attached to the rear end of the machine and provided with a depending blast-valve 52, suspended in front of the blast or air exit openings 53 to the rear of the suction-fans 48.

54 designates upwardly-extending arms mounted upon the shaft 51 and adjustably secured at their upper ends to horizontally-arranged bars 55, secured to sliding valves 56, mounted in the sides of the divisions or sections 3 of the machine, as shown.

57 designates horizontally-disposed bars securely attached to the arms 54 or formed integral therewith and carrying the adjustably-mounted weights 58. By moving the weights 58 upon the arms 57 the force of the blast required to move the blast-valve 52 may be varied as required.

59 designates valves formed in the front wall of the suction-fan chambers, by means of which the amount of air admitted thereto may be regulated and the force of the air-currents regulated accordingly and as found most desirable.

60 and 61 designate lower trunks mounted immediately beneath the trunks 31 and 32 and designed to re-treat the ore received from the valves 33$^a$ above through the spouts 62.

63 and 64 designate spouts, the spout 63 receiving the finished ore from the valve 33 of the trunks 31 above and the spout 64 receiving the finished tailings from the valve 33 of the trunks 32 and depositing the same beneath the machine, where it may be conveyed from machine, if desired, by any suitable and convenient means.

65 and 65$^a$ designate valves formed at the base of the lower trunks 60 and 61, like those of the trunks 31 and 32, the valves 65$^a$, trunk 60, depositing finished ore, and the valves 65, trunk 61, depositing finished tailings which are conveyed from machine, valves 65 of trunk 60 and 65$^a$, trunk 61, depositing unfinished material to be re-treated.

66 designates dividing boards or partitions mounted transversely in the trunks 60 and 61 and pivotally attached at their lower ends intermediate the valves 65 and 65$^a$, formed at the lower ends of said trunks.

67 designates operating-rods attached to the upper or free ends of the dividing boards or partitions 66 and extending to the front end of the trunks 60 and 61, by means of which the dividing boards or partitions 66 may be set at any desired point or inclination in the trunks 60 and 61 to provide for the various ores and the desired concentrations thereof.

69 designates a series of corrugated feeding-rollers suitably mounted beneath the three drums G, H, and I of the sizing reel or screen 15 and beneath the spouts 62 and designed to uniformly feed and distribute the material received from above into the vertically-disposed suction-trunks 27 and trunk 60 and 61, respectively. 70 designates pulleys mounted upon the shafts 71 of said feeding-rollers 69 and operated by a belting communicating with any other suitable pulley on the machine.

71$^a$ designates horizontally-disposed bars pivotally secured to posts 72, suitably mounted and carrying vertically-disposed bank-valves 73, adapted to engage the periphery of the feeding-rollers 69 and distribute the material along the same.

74 designates weights adjustably mounted upon the bars 71$^a$, and by adjusting the same upon said bars the degree of pressure of said bank-valves 73 upon the feeding-rollers 69 may be regulated.

Having described the various parts of my invention, its operation and advantages will be readily understood by those skilled in the art to which it appertains.

It will be understood that by means of the valves 36, 37, and 59, hereinbefore described, and the valves 68 the amount of air admitted to the various parts of the machine may be regulated, whereby the force of the various air-currents may be increased, as found best in treating the various ores and the required concentrations thereof. By means of the hand-nut 21, mounted upon the bar 19, the length of the stroke or oscillation of the adjustable feeding device may be regulated whereby to regulate the feeding of the ore to the sizing reel or screen 15. As the force of the air-blast from the suction-fan 48 increases the depending blast-valve 52 is moved outwardly, swinging the arm 54 and moving the sliding valves 56, opening the same and admitting more air to the suction-fan, and thereby lessening the force of the various air-currents in the various parts of the machine.

Various changes in the form, proportion, and the minor details of construction may be resorted to without departing from the principles or sacrificing any of the advantages of this invention.

Having thus described my invention, without having attempted to set forth all the forms in which it may be made or all the modes of its use, I declare that what I claim, and desire to secure by Letters Patent, is—

1. An ore separating and concentrating machine, consisting of a suitable frame provided with side and end walls, a series of partition or division walls extending lengthwise of the machine and dividing the same into divisions or sections, a revoluble drum, provided with lifters about its inner periphery, mounted at the front of the machine, a series of steam-pipes mounted within said drum, an inclined revoluble sizing reel or screen mounted beneath said revoluble drum, a hopper mounted at one end of said drum and sizing reel or screen, a spouting secured over the feed-opening of said hopper and provided with an inwardly and downwardly extending chute extending into one end of said sizing reel or screen, a chute mounted beneath said sizing-reel, a series of trunks formed in said divisions or sections of the machine, a series of valves mounted in said trunks and said divisions or sections, suction-fans mounted in the ends of said divisions or sections, a depending blast-valve mounted in front of said suction-fans, and sliding valves mounted in the side walls of said divisions or sections and adapted to be operated by the said blast-valve.

2. An ore separating and concentrating machine, consisting of suitable side and end walls forming divisions or sections, a suitable drum mounted at the front end thereof and containing a series of steam-pipes, an inclined revoluble sizing-reel mounted beneath said revoluble drum, means for conveying and feeding the material from said drum to said sizing-reel, means for conveying the material discharged from said sizing-reel to said divisions or sections, a series of trunks formed with said divisions or sections, valves mounted in said trunks and sections, suction-fans mounted in the ends of said sections, and means for operating said valves mounted in said trunks or sections.

3. An ore separating and concentrating machine, consisting of a series of divisions or sections extending longitudinally thereof, a series of suction-fans mounted in the rear ends of said divisions or sections, a series of trunks formed therein, valves mounted in said trunks and sections, a sizing-reel mounted at the front ends of said divisions or sections and adapted to discharge material therein, a revoluble drum mounted above said sizing-reel and provided with a series of lifters about its inner periphery, means for conveying and feeding the material from said revoluble drum to said sizing-reel, a series of steam-pipes mounted within said revoluble drum, and a hopper mounted at one side thereof, and adapted to convey the material therein.

4. In an ore separating and concentrating machine, the combination with a series of divisions or sections extending longitudinally thereof, a sizing-reel mounted at the front ends thereof and a series of trunks formed therein; of a series of suction-fans mounted in the ends of said divisions or sections, valves mounted in said trunks and sections, dividing-boards mounted in said trunks and sections and pivotally mounted intermediate the valves of said trunks, and means for controlling and operating said valves and dividing-boards.

5. In an ore separating and concentrating machine, the combination with a series of divisions or sections extending longitudinally thereof, a series of trunks formed therein, dividing-boards pivotally mounted transversely in said trunks, means for operating and adjusting said dividing-boards, suction-fans mounted in the ends of said divisions or sections and valves mounted in said trunks and sections; of a sizing-reel mounted at the front ends of said divisions or sections and adapted to discharge the material therein, a revoluble drum mounted above said sizing-reel, a series of steam-pipes mounted within said drum, means for conveying and feeding the material from said revoluble drum to said sizing-reel, and a hopper suitably mounted and adapted to convey the material within said revoluble drum.

6. In an ore separating and concentrating machine, the combination with a series of divisions or sections extending longitudinally thereof, a sizing-reel mounted at the front ends thereof with a series of trunks formed therein, and valves mounted in said divisions or sections, dividing-boards mounted in said trunks and sections and means for operating and controlling said valves and dividing-boards.

7. An ore separating and concentrating machine, consisting of a suitable drum mounted at the front end thereof, a series of steam-pipes mounted therein; an inclined revoluble sizing-reel mounted beneath said revoluble drum, means for conveying and feeding the material from said drum to said sizing-reel, a series of divisions or sections, provided with suction-fans, adapted to carry and grade the material as discharged from said sizing-reel, trunks formed in said divisions or sections, valves mounted at the bottom of said trunks, dividing-boards mounted in said trunks, and means for operating said valves.

8. In an ore separating and concentrating machine, the combination with a suitable drum mounted at the front end thereof, and a sizing-reel mounted beneath said revoluble drum; of a hopper mounted at one end of said drum and sizing-reel, a spouting secured over the feed-opening of said hopper, an inwardly and downwardly extending chute formed with said spouting and extending into one end of said sizing-reel, a vertically-mounted gate in said feed-opening, a pivotally-mounted lever suitably secured to said gate, and means for operating and adjusting said lever to said gate whereby to regulate the feeding of the material through said feed-opening.

9. In an ore separating and concentrating machine, the combination with an inclined revoluble drum suitably mounted, and an inclined revoluble sizing-reel mounted beneath said drum; of a hopper mounted at one end of said drum and sizing-reel, a feed-opening therein, a vertically-mounted gate in said feed-opening, a lever secured to said gate, a second lever secured thereto by means of an adjustable rod, a cam secured to the shaft of said sizing-reel whereby said levers are oscillated, and an inwardly and downwardly extending chute formed with said hopper and adapted to convey the material within one end of said sizing-reel.

10. In an ore separating and concentrating machine, the combination with a series of divisions or sections extending longitudinally thereof, a series of suction-fans mounted in the rear ends of said divisions or sections, and a series of trunks formed in said divisions or sections; of valves formed at the lower ends of said trunks, dividing boards or partitions mounted transversely in said trunks and pivotally attached at their lower ends intermediate said valves, and means for operating and adjusting said dividing boards or partitions.

11. In an ore separating and concentrating machine, the combination with a series of divisions or sections extending lengthwise of the machine, a series of trunks formed therein valves formed in said divisions or sections, and valves mounted at the bottom of said trunks; of a series of horizontally-arranged depending swinging valves mounted in the rear of said divisions or sections, and suction-fans mounted in said divisions or sections at the rear of the machine and beneath said swinging valves.

12. In an ore separating and concentrating machine, the combination with a series of divisions or sections extending lengthwise of the machine, a series of trunks formed therein, valves mounted in said trunks and sections and suction-fans mounted in the rear of said divisions or sections; of air-exit openings formed at the rear of said suction-fans, a depending blast-valve suspended in front of the blast or air-exit openings, a series of sliding valves mounted in the sides of said divisions or sections, and means adjustably connecting said sliding valves with said depending blast-valve.

13. In an ore separating and concentrating machine, the combination with a series of divisions or sections extending longitudinally thereof, trunks formed therein, valves mounted at the bottom of said trunks, and a series of suction-fans mounted at the rear of said sections; of an air-exit opening formed in the rear of the machine to the rear of said suction-fans, a shaft mounted in suitable bearings attached to the rear end of the machine, a depending blast-valve attached to said shaft and suspended in front of said air-exit opening, a series of upwardly-extending arms mounted upon said shaft, a series of sliding valves mounted in the sides of said divisions or sections, and a series of horizontally-arranged bars secured at one end to said sliding valves and at the other adjustably secured to said upwardly-extending arms.

In testimony whereof I have affixed my signature in presence of two subscribing witnesses.

WILLIAM P. CLIFFORD.

Witnesses:
L. L. FUNKHOUSER,
J. L. HELLYER.